No. 620,736. Patented Mar. 7, 1899.
J. & F. CAVAGNARO.
KNEADING MACHINE.
(Application filed May 16, 1898.)

(No Model.)

WITNESSES:
Geo. Le Guern.
David G. Rode

INVENTORS
John Cavagnaro
Francis Cavagnaro
BY
Clarence D. Burger
ATTORNEY

UNITED STATES PATENT OFFICE.

JOHN CAVAGNARO AND FRANCIS CAVAGNARO, OF NEW YORK, N. Y.

KNEADING-MACHINE.

SPECIFICATION forming part of Letters Patent No. 620,736, dated March 7, 1899.

Application filed May 16, 1898. Serial No. 680,818. (No model.)

*To all whom it may concern:*

Be it known that we, JOHN CAVAGNARO and FRANCIS CAVAGNARO, citizens of the United States, residing in the city, county, and State of New York, have invented a new and useful Improvement in Kneading-Machines; and we do hereby declare that the following is a full, clear, and exact description of the same.

Our invention relates to kneading-machines such as are used for kneading macaroni dough or paste and in which usually corrugated conical kneading-rolls are revolved on stationary axes in a horizontally-revolving dough-pan which is adjustable vertically with respect to the kneading-rolls, the lower elements of which are parallel to the bottom of the dough-pan. In such machines, as the kneading-rolls taper toward the central shaft of the pan, the dough in the pan underneath the rolls naturally tends to work toward said center.

The object of our invention is to throw the dough outward from the center of the pan, at the same time piling up the dough preparatory to its passage beneath the kneading-rolls and without interfering with the vertical adjustment of the pan. We attain this end by means of dough-guides constructed and arranged in novel fashion; and in order that our invention may be fully understood we shall first describe the same in detail and then particularly claim the same.

Reference is to be had to the accompanying drawings, forming part of this specification, in which the same parts are designated by like letters throughout.

Figure 1:
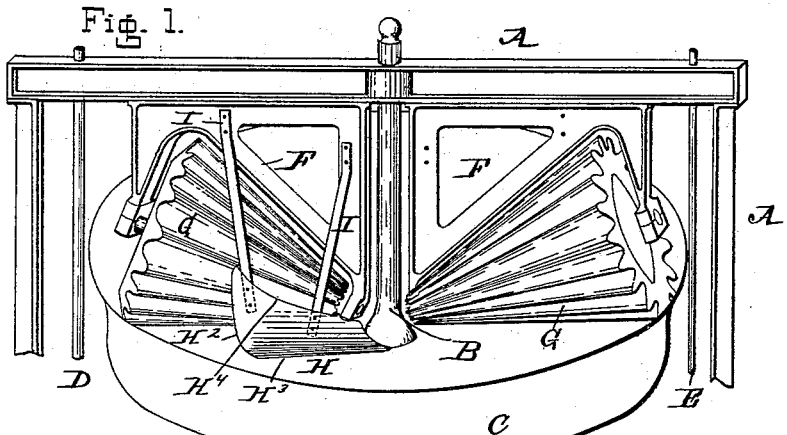
Figure 2:
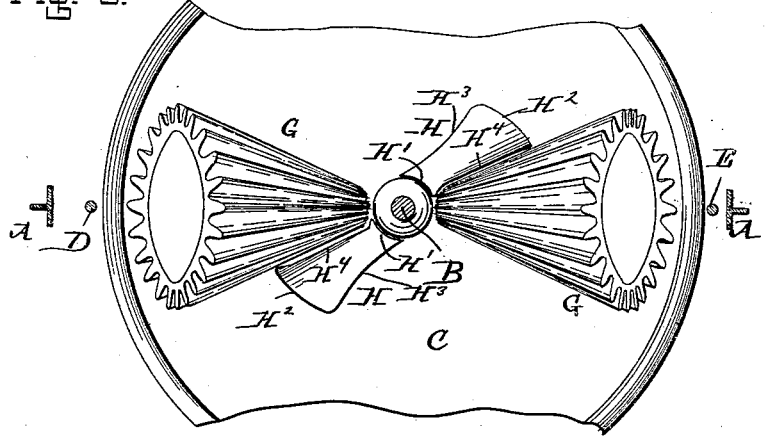
Figure 3:
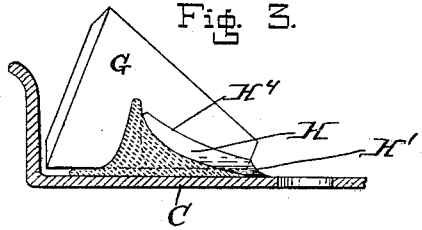
Figure 4:
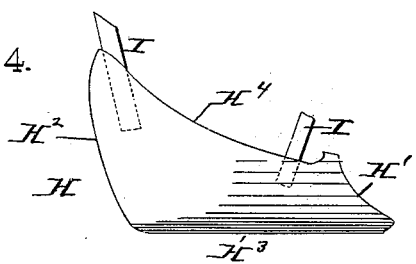

Figure 1 is a side elevation of the essential parts of a macaroni-kneading machine embodying our invention. Fig. 2 is a sectional plan view of the same. Fig. 3 is a detail sectional view of the same, showing the working of one of the dough-guides. Fig. 4 is a detail view of one of the dough-guides.

A designates the frame of the kneading-machine in which we have reduced our invention to practice; B, a vertical shaft adjustable vertically in said frame and carrying the horizontally-revoluble dough-pan C; D, the shaft for driving the pan C; E, the rod for raising and lowering the pan C; F, hangers depending from the upper member of the frame A into the pan C, and G corrugated conical kneading-rolls journaled in the hangers F, with their lower elements lying parallel and close to the bottom of the pan C and their diametrically-opposed stationary axes thus converging downward. All these parts are substantially of a well-known description, and we claim no invention therein.

The macaroni dough placed in the bottom of the pan C is carried repeatedly by the revolving pan beneath the kneading-rolls G, which are therefore caused to revolve therewith and knead the dough. To prevent the dough from working from beneath the rolls G toward the center of the pan and, further, to pile up the dough before it passes beneath the rolls, so as to more effectually knead it, we employ a pair of substantially radial dough-guides H, arranged close to and on diametrically opposite sides of the pan-shaft B and supported on light flexible arms I, attached to the fixed hangers F, so as to yield with the vertical adjustment of the pan C. Each dough-guide H has its inner edge H' curved in plan to fit closely to the pan-shaft B, its outer edge $H^2$ in plan substantially concentric with its inner edge H', its face concave toward the approaching dough, its forward edge $H^3$ resting throughout its length on the bottom of the pan, so as to cause all the dough meeting said edge to ride over it, and its rear and upper edge $H^4$ carried well above the bottom of the pan into close proximity to the corrugations of the corresponding kneading-roll and also inclined upwardly and outwardly. The dough meeting and riding over the forward edges $H^3$ of the two guides H is thus piled up and shifted outward thereby, as indicated in Fig. 3, until it is thrown off the outer edge $H^2$ beneath the kneading-rolls, which are thereby caused to effectually knead the same into a homogeneous mass.

We claim as our invention—

In a kneading-machine, the combination with the frame, the revoluble pan and its shaft, and the diametrically opposite conical kneading-rolls in the pan, of dough-guides fixed on opposite sides of the pan-shaft, with their inner edges fitting closely to the pan-shaft, their faces concave from the respective kneading-rolls, their forward edges resting on the bottom of the pan, their upper edges rising upwardly and outwardly close to the corrugations of the rolls and their outer edges curving from the bottom of the pan upward to the corrugations of the rolls.

In testimony whereof we have hereunto set our hands the 6th day of April, 1898.

JOHN CAVAGNARO.
FRANCIS CAVAGNARO.

In presence of—
CLARENCE L. BURGER,
DE WITT C. REED.